US010963250B2

(12) United States Patent
Craske et al.

(10) Patent No.: US 10,963,250 B2
(45) Date of Patent: Mar. 30, 2021

(54) SELECTIVELY SUPPRESSING TIME INTENSIVE INSTRUCTIONS BASED ON A CONTROL VALUE

(71) Applicant: ARM LIMITED, Cambridge (GB)

(72) Inventors: Simon John Craske, Cambridge (GB); Antony John Penton, Little Canfield (GB)

(73) Assignee: ARM Limited, Cambridge (GB)

( * ) Notice: Subject to any disclaimer, the term of this patent is extended or adjusted under 35 U.S.C. 154(b) by 233 days.

(21) Appl. No.: 14/911,376

(22) PCT Filed: Jul. 7, 2014

(86) PCT No.: PCT/GB2014/052053
§ 371 (c)(1),
(2) Date: Feb. 10, 2016

(87) PCT Pub. No.: WO2015/025127
PCT Pub. Date: Feb. 26, 2015

(65) Prior Publication Data
US 2016/0202977 A1    Jul. 14, 2016

(30) Foreign Application Priority Data
Aug. 23, 2013 (GB) ...................... 1315109

(51) Int. Cl.
*G06F 9/30* (2018.01)
*G06F 9/48* (2006.01)
(52) U.S. Cl.
CPC ........ *G06F 9/3005* (2013.01); *G06F 9/30145* (2013.01); *G06F 9/4812* (2013.01); *G06F 9/4887* (2013.01)
(58) Field of Classification Search
CPC ................... G06F 2009/45575; G06F 9/45533
See application file for complete search history.

(56) References Cited

U.S. PATENT DOCUMENTS

| 6,058,410 A | 5/2000 | Sharangpani |
| 6,427,202 B1 | 7/2002 | Richardson et al. |
| (Continued) | | |

FOREIGN PATENT DOCUMENTS

| CN | 101826000 | 9/2010 |
| CN | 101866281 | 10/2010 |
| (Continued) | | |

OTHER PUBLICATIONS

International Search Report for PCT/GB2014/052053, dated Oct. 7, 2014, 3 pages.

(Continued)

*Primary Examiner* — Jacob Petranek
(74) *Attorney, Agent, or Firm* — Nixon & Vanderhye P.C.

(57) ABSTRACT

The execution of time intensive instructions can lead to critical events being responded to late or not being responded to at all. An information processing apparatus comprises processing circuitry (60) for executing instructions comprising one or more time intensive instructions and exception generating circuitry (100) for generating at least one exception for the processing circuitry. The processing circuitry maintains a control value (20) for indicating whether or not the time intensive instructions can be executed. When a time intensive instruction is encountered, if the control value indicates that time intensive instructions cannot be executed then a first exception triggers the processing circuitry to suppress execution of the time intensive instruction. Alternatively, if the control value indicates that time intensive instructions can be executed, then the time intensive instruction is executed.

24 Claims, 5 Drawing Sheets

(56) References Cited

U.S. PATENT DOCUMENTS

| | | | | |
|---|---|---|---|---|
| 6,493,741 | B1* | 12/2002 | Emer | G06F 9/30087 710/200 |
| 7,181,600 | B1 | 2/2007 | Uhler | |
| 7,590,823 | B1 | 9/2009 | Ansari et al. | |
| 7,966,480 | B2* | 6/2011 | Catherwood | G06F 9/30101 712/208 |
| 9,201,749 | B2 | 12/2015 | Williams et al. | |
| 2006/0026525 | A1 | 2/2006 | Fischer et al. | |
| 2007/0234358 | A1* | 10/2007 | Hattori | G06F 9/45533 718/1 |
| 2007/0266374 | A1 | 11/2007 | Grisenthwaite et al. | |
| 2009/0037918 | A1 | 2/2009 | Brown et al. | |
| 2010/0088706 | A1 | 4/2010 | Dong et al. | |
| 2010/0306766 | A1* | 12/2010 | Schneider | G06F 9/45533 718/1 |
| 2013/0340077 | A1* | 12/2013 | Salsamendi | G06F 9/45558 726/23 |

FOREIGN PATENT DOCUMENTS

| | | |
|---|---|---|
| JP | 2010-152458 A | 7/2010 |
| JP | 2011-134162 A | 7/2011 |
| WO | 2012/123706 | 9/2012 |

OTHER PUBLICATIONS

Search Report for GB 1315109.7, dated Jan. 17, 2014, 8 pages.
Marlowe et al., "Schedulability-Analyzable Exception Handling for Fault-Tolerant Real-Time Languages", Real Time Systems, Sep. 1, 1994, pp. 183-212.
Japanese Office Action dated Mar. 15, 2018 in JP Application No. 2016-535520 and English translation, 9 pages.
English translation of Taiwanese Office Action dated Jul. 4, 2018 in TW Application No. 103125333, 4 pages.
First Office Action dated Jul. 30, 2018 in CN Application No. 201480045495.8 and English translation, 18 pages.
Second Office Action dated Apr. 15, 2019 in CN Application No. 201480045495.8 and English translation, 17 pages.
Office Action dated May 10, 2019 in EP Application No. 14741938. 6, 9 pages.
Examination Report for IN Application No. 201647006984 dated Jul. 29, 2020, 6 pages.
Examination Report for GB Application No. 1315109.7 dated Aug. 6, 2020, 2 pages.
Examination Report for GB Application No. 1315109.7 dated May 21, 2020, 4 pages.
Office Action for KR Application No. 10-2016-7004314 dated Jul. 9, 2020 and English translation, 9 pages.
Office Action for BR Application No. 112016002997 dated Feb. 19, 2020 and English translation, 6 pages.

* cited by examiner

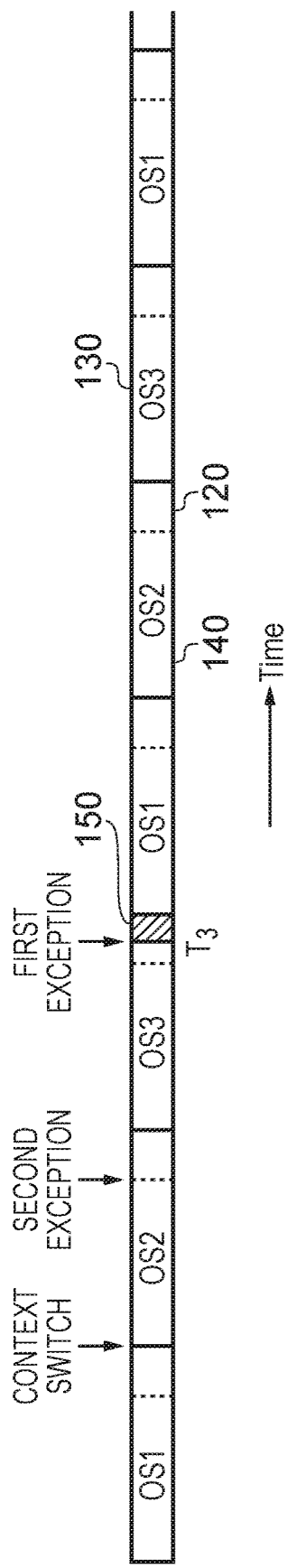
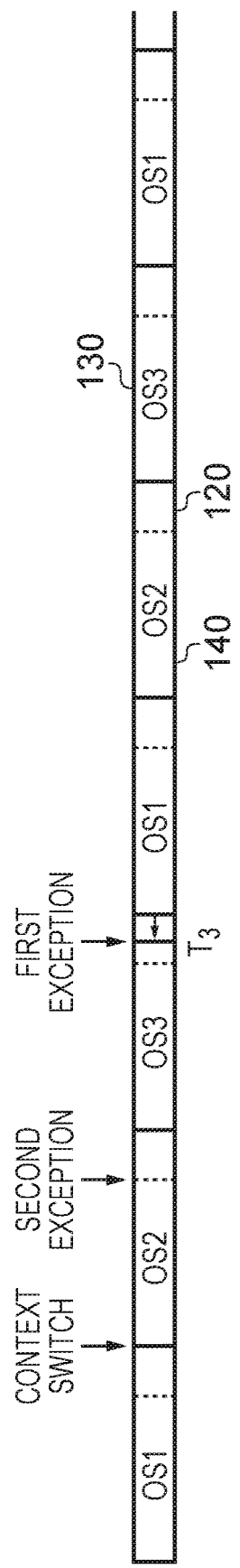
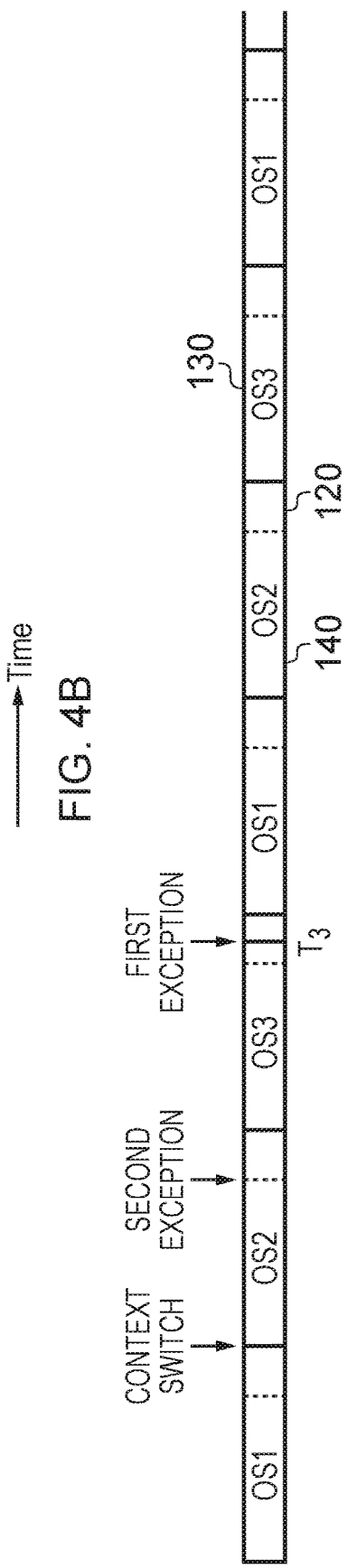

SELECTIVELY SUPPRESSING TIME INTENSIVE INSTRUCTIONS BASED ON A CONTROL VALUE

This application is the U.S. national phase of International Application No. PCT/GB2014/052053 filed 7 Jul. 2014, which designated the U.S. and claims priority to GB Patent Application No. 1315109.7 filed 23 Aug. 2013, the entire contents of each of which are hereby incorporated by reference.

TECHNICAL FIELD

The present technical is directed towards the field of data processing devices. More particularly, the present technique may have relevance to handling time intensive instructions in data processing devices.

BACKGROUND

In real-time systems it is often necessary to respond to a particular event within a period of time or at a specific time. In order to achieve this, such systems often rely on the deterministic behaviour of the system as a whole. For example, it may be necessary to provide software with access to a processor or another hardware device, such as a sensor, at predetermined intervals or times.

One example of a real-time system is an airbag deployment system that is designed to detect the collision of a vehicle and, on the detection of such a collision, to deploy the airbags. In such a system, it may be essential that the airbags are deployed within a very short period of time from a collision event having been detected.

However, the problem of responding to a particular event within a given period of time is compounded if the hardware is busy. In particular, if the processor is executing a time consuming instruction, then there is a delay before any other work can be carried out. Considering the airbag deployment system, for example, if the processor begins execution of a time consuming instruction immediately prior to a collision event occurring, then it may be necessary for the processor to complete execution of the time consuming instruction before the airbags can be deployed. This could lead to the situation in which a collision has occurred, but the airbag deployment system will not operate for a long period of time until the time consuming instruction is completed.

In real-time systems, therefore, the execution of time consuming instructions at an inconvenient time can have a significant detrimental effect on the overall performance of the system, and can even lead to the complete failure of the system.

One way of dealing with such instructions is to simply terminate their execution when a critical event occurs. However, this is wasteful of any processor resources that have already been expended on the instruction and it can often require the expenditure of even more processor resources to restore the state of the processor to what it was before execution of the time consuming instruction began. Additionally, some instructions are either, by their nature, uninterruptible, or can produce inconvenient side effects if interrupted.

SUMMARY

According to one aspect, there is provided an information processing apparatus comprising processing circuitry configured to execute instructions comprising one or more time intensive instructions; and exception generating circuitry configured to generate at least one exception for said processing circuitry, wherein said processing circuitry is configured to maintain a control value for indicating whether said time intensive instructions can be executed; wherein said exception generating circuitry is configured, in response to one of said time intensive instructions when said control value is in a first state indicating that said time intensive instructions cannot be executed, to generate a first exception to trigger the processing circuitry to suppress execution of said one of said time intensive instructions; and wherein said exception generating circuitry is configured, in response to one of said time intensive instructions when said control value is in a second state indicating that said time intensive instructions can be executed, to execute said one of said time intensive instructions.

The present technique recognises that the execution of time intensive instructions can sometimes be detrimental, particularly in a real-time system when such instructions occur prior to a critical event that must be responded to relatively quickly. For example, if the system were to begin execution of a time intensive instruction and a critical event or exception were to occur immediately afterwards, the time intensive instruction may need to complete before the critical event or exception could be responded to. In real-time systems, this may be unacceptable, since it may be necessary for the exception or event to be responded to within a very short period of time.

According to the above aspect, a control value is provided for indicating whether or not time intensive instructions can be executed, i.e. whether time intensive instructions are permitted to be executed, by a processing circuitry. If the control value is set to a state in which time intensive instructions cannot be executed, then an attempt to execute a time intensive instruction will result in a first exception being generated by exception generating circuitry, causing the execution of that time intensive instruction to be suppressed. Alternatively, if the state of the control value is such that time intensive instructions can be executed, then execution of those instructions continues and no first exception is generated. Hence, by controlling a state of the control value, time intensive instructions can be permitted or disallowed as required. Accordingly, if it is known that a critical event is due to happen, or has a high probability of occurring, then the control value can be set to disallow time intensive instructions in the lead up to that event. Hence, when the event itself occurs, there should be no time consuming instructions occurring and the event can be responded to quickly.

There are many different examples of time intensive instructions. In some embodiments, a time intensive instruction may be considered to be an instruction that requires multiple processing cycles of the processing circuitry to execute. Instead or in addition to this example, time intensive instructions may comprise instructions that cannot be interrupted once started.

In addition to, or instead of either of these two examples, a time intensive instruction may comprise at least one of: a floating point square root instruction, a divide instruction, a non-interruptible load multiple instruction, a non-interruptible store multiple instruction, and at least one predetermined single-instruction-multiple-data (SIMD) instruction.

Floating point square root instructions and integer or floating point divide instructions may be time consuming simply due to the nature of these instructions requiring a large number of processing cycles to complete. It may be preferable to not interrupt these instructions, since doing so would require the time intensive operation to begin again. Furthermore, it is possible that a later instruction in the program order executing after or in parallel with the time intensive square root or divide instruction may overwrite the input registers of the square root or divide instruction before that instruction has completed, making it very difficult or even impossible for those instructions to be restarted if interrupted. Load and store instructions may be marked as being non-interruptible for example if the addresses of memory being referenced in the instructions are treated as Device type memory. Such memory may be mapped to a hardware device and reading or writing to these memory locations can cause the device to act in a particular way. Interrupting these instructions can lead to incorrect or non-deterministic behaviour of the hardware device. SIMD instructions are instructions for which a single processing operator is executed in parallel on multiple data elements within the same input operand(s). At least some SIMD operations can involve many processor cycles and, as with integer or floating point divide instructions, it may not be possible to restart such instructions if interrupted.

Other appropriate examples of the term "time intensive instruction" will be apparent to the skilled person and may be used instead of, or in addition to any of those examples provided above.

The processing circuitry may be configured to execute first software at a first privilege level and to execute second software at a second privilege level higher than the first privilege level. That is, the first software executes at a less privileged level than the second software. The term "higher" refers to the level of privilege and not any numeric value associated with the privilege level. Accordingly, a more privileged level may be numerically higher or lower than a less privileged level. In general, "higher" privileged software may have rights which are not available to software at a "lower" privilege.

In some of these embodiments, the second software may be configured to control the processing circuitry to change said control value.

The exception generating circuitry may be configured to generate the first exception in response to one of said time intensive instructions of said first software. That is, the exception generating circuitry may generate the first exception when the first software attempts to execute one of the time intensive instructions. The behaviour of the first software may therefore be managed by the control value.

Hence, the second software running at a more privileged may set the control value, and the first software running at a less privileged level may be affected by the control value. Such embodiments are suitable for systems in which one set of software is managed by another piece of software, such as in a virtualised environment.

The exception generating circuitry may be configured to only generate the first exception in response to one of the time intensive instructions of software executing at a lower privilege level than said second privilege level. That is, a first exception will be generated only for software that executes at a lower privilege level than the second privilege level. Phrased differently, the exception generating circuitry is configured to not generate the first exception in response to one of the time intensive instructions of software executing at said second privilege level. In some of these embodiments, the exception generating circuitry is configured to not generate said first exception in response to one of said time intensive instructions of software executing at the most privileged level. Accordingly, some software may always be entitled to generate time intensive instructions. For example, the hypervisor or management software may be entitled to always execute time intensive instructions.

The first software may comprise one or more guest operating systems and the second software may comprise a hypervisor. The present techniques are well-suited to an environment including a hypervisor and one or more virtualised guest operating systems, since the hypervisor is able to control the behaviour of each guest operating system to ensure that resources are distributed fairly. For example, by having the hypervisor set the control value, it is possible to limit the effect of time intensive instructions issued by a first guest operating system on a second guest operating system.

The control value may be changed in response to one or more predetermined events, such as a context switch, which changes which software is being executed at a particular instant on the processing circuitry. For example, a context switch may suspend processing of one guest operating system and resume processing of another guest operating system or a hypervisor. In such embodiments, the processing circuitry is responsive to the context switch to change the control value to the second state. That is, in response to a context switch, the processing circuitry changes the control value such that time intensive instructions can be executed. In some cases, allowing time intensive instructions immediately after a context switch is the most appropriate time for such instructions to be executed, since it is unlikely that another operating system will begin execution so shortly after a context switch has occurred. Accordingly, the operating system has the most time available to carry out time intensive instructions before the next context switch occurs.

Another example of a predetermined event is a second exception, which may be generated a first predetermined period of time before an expected event. For example, an expected event may be a context switch and the second exception may occur a second predetermined period of time after a previous context switch. That is, after a predetermined period of time elapses after a context switch takes place the second exception is generated, causing the control value to change state such that time intensive instructions cannot be executed. In an embodiment making use of a hypervisor, the second software (e.g. the hypervisor) may control the processing circuitry in response to the second exception. Context switches are typically periodic. Hence, by suppressing time intensive instructions after a period of time has elapsed since the last context switch, and before the next context switch is expected, it is less likely that the execution of a time intensive instruction will delay a future context switch, and hence it is less likely that other software executing on the hardware apparatus will be affected.

In some cases, the first predetermined period of time is less than the second predetermined period of time. In particular, a ratio of the first predetermined period of time to the second period of time may be 1:9. In other words the period of time for which time intensive instructions can be run may be longer than the period of time for which time intensive instructions cannot be run, with the period of time for which time intensive instructions cannot be run being shortly before the occurrence of a subsequent context switch. The advantage of this feature is that time intensive instructions can generally be permitted (90% of the time), which allows the data processing device to operate normally. Only for a short period of time are time intensive instructions suppressed.

In response to the second exception, the processing circuitry may be configured to change the control value to said first state indicating that said time intensive instructions cannot be executed. In this way, in preparation for an expected event, time intensive instructions are disallowed, thus making the system more able to quickly respond to the expected event rather than being require to execute time intensive instructions.

In some embodiments, said processing circuitry is configured to switch to executing said second software in response to the first exception. There are a variety of ways in which the second software may react to the first exception being generated, some examples of which are described below. It will be appreciated by the skilled person that these examples are not limiting. Furthermore, these examples may be combined in any manner as appropriate.

The second software may be configured to control said processing circuitry to change an active one of said plurality of first software. That is, in response to said first exception, the second software changes the active one of said plurality of first software. For example, a different guest operating system could be switched in early, before an upcoming context switch would normally allow. Accordingly, processing cycles of the processing circuitry are not wasted and can be expended according to the guest operating system that is switched in.

In response to said first exception, said processing circuitry may be configured to not execute said plurality of first software until a subsequent context switch occurs. In such a situation, none of the plurality of first software will be executed until another context switch is received. By not altering which of the first software is executed in response to the first exception being generated, the deterministic nature of the processing apparatus is maintained. That is, the time at which a particular piece of first software was due to be executed will not change. However, the first software that issued a time intensive instruction is not permitted to continue execution. Once a context switch occurs, an active one of said plurality of first software may be changed, and that active one of said plurality of first software may be permitted to execute instructions as normal and the time consuming instruction will be executed later when processing switches back to the original first software.

In some cases, in response to said first exception, said processing circuitry is configured to continue execution of an active one said plurality of first software without executing said one of said time intensive instructions. That is, in these cases, the active one of said first software remains active and is permitted to continue execution. However, the time intensive instructions that caused the first exception to be generated are not executed and may need to be reissued at a later time.

According to a second aspect there is provided a machine-implemented method for an information processing apparatus, said method comprising the steps: executing one or more instructions comprising one or more time intensive instructions; maintaining a control value for indicating whether said time intensive instructions can be executed; in response to one of said time intensive instructions when said control value indicates that said time intensive instructions cannot be executed, generating a first exception to suppress execution of said one of said time intensive instructions; and in response to one of said time intensive instructions when said control value indicates that said time intensive instructions can be executed, executing said one of said time intensive instructions.

According to a third aspect, there is provided an information processing apparatus comprising: processing means for executing instructions comprising one or more time intensive instructions; and exception generating means for generating at least one exception for said processing circuitry, wherein said processing means is configured to maintain a control value for indicating whether said time intensive instructions can be executed; wherein said exception generating means is configured, in response to one of said time intensive instructions when said control value is in a first state indicating that said time intensive instructions cannot be executed, to generate a first exception to trigger the processing means to suppress execution of said one of said time intensive instructions; and wherein said exception generating means is configured, in response to one of said time intensive instructions when said control value is in a second state indicating that said time intensive instructions can be executed, to execute said one of said time intensive instructions.

BRIEF DESCRIPTION OF THE DRAWINGS

The present technique will be described further, by way of example only, with reference to embodiments thereof as illustrated in the accompanying drawings, in which:

FIG. 4A schematically shows a response to a first exception in accordance with one embodiment;

FIG. 4B schematically shows a response to a first exception in accordance with a second embodiment;

FIG. 4C schematically shows a response to a first exception in accordance with a third embodiment;

DESCRIPTION OF EMBODIMENTS

Figure 1:
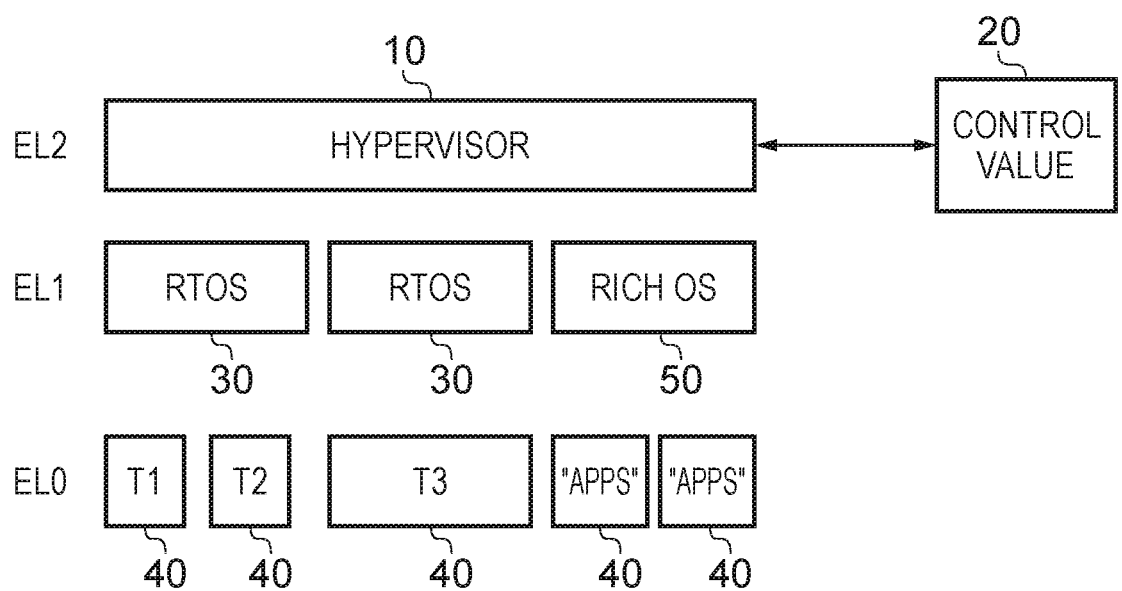
FIG. 1 schematically shows a hierarchical representation of software executed by an information processing apparatus to which the present techniques may be applied.

FIG. 1 schematically shows software executing in a virtualised system that may make use of the presently described techniques.

The software is hierarchical and comprises a hypervisor 10 running at an exception level EL2 (also referred to as a privilege level or execution level), which manages a number of guest operating systems running at exception level EL1. The exception level indicates the degree of privilege that software running at that exception level is given. In this example, the hypervisor runs at a higher exception level than the guest operating systems, and so the hypervisor has more privileges than the guest operating systems. This particular example shows three exception levels (EL2, EL1, and EL0). However, it will be appreciated that the techniques described herein are applicable to a system comprising any plural number of exception levels.

The guest operating systems include real-time operating systems 30 and rich operating systems 50. Real-time operating systems are typically designed to respond quickly to detected events rather than to continually run tasks as requested by a user. Many of the events may be critical, indicating that they must be responded to within a period of time to avoid catastrophic failure of the system. Rich operating systems may also respond to events, but are typically not driven by them and typically do not deal with critical events at all. Examples of rich operating systems include those that are well known in home environments, such as "windows" and "linux". For example, a real time operating system may control airbags or brakes in a car, whereas a rich operating system may control a car stereo.

Each operating system 30, 50 may manage one or more real-time or non real-time tasks 40. The tasks operate at the even lower exception level EL0.

In this embodiment, the hypervisor shares its resources between the multiple guest operating systems. That is, at any one time only one of the guest operating systems is actively executing and other operating systems must wait. The selection of the active operating system and determination of which operating system is due to be executed next is controlled by the hypervisor.

It will be appreciated, therefore, that the performance of each guest operating system is partly determined by the behaviour of the other guest operating systems. For example, if one of the rich operating systems 50 begins execution of a task that is particularly time consuming, and therefore uninterruptible, then the hypervisor 10 may not allow the real-time operating systems 30 a share of the processing circuitry until that time consuming instruction has finished being executed. Therefore, if the real-time operating systems are waiting to respond to a critical event then they must wait.

In the embodiment shown in FIG. 1, the hypervisor 10 sets a control value 20, which controls whether the guest operating systems 30, 50 or one of the tasks 40 managed by those guest operating systems are permitted to execute time intensive instructions, which may prevent the real-time operating systems 30 from responding to real-time critical events. Accordingly, by changing a state of the control value, it is possible to inhibit or suppress the execution of time intensive instructions to enable real-time critical events to be handled promptly. The control value 20 may form part of the memory 70, registers 90, processing circuitry 60, or may be an entirely separate device.

Figure 2:
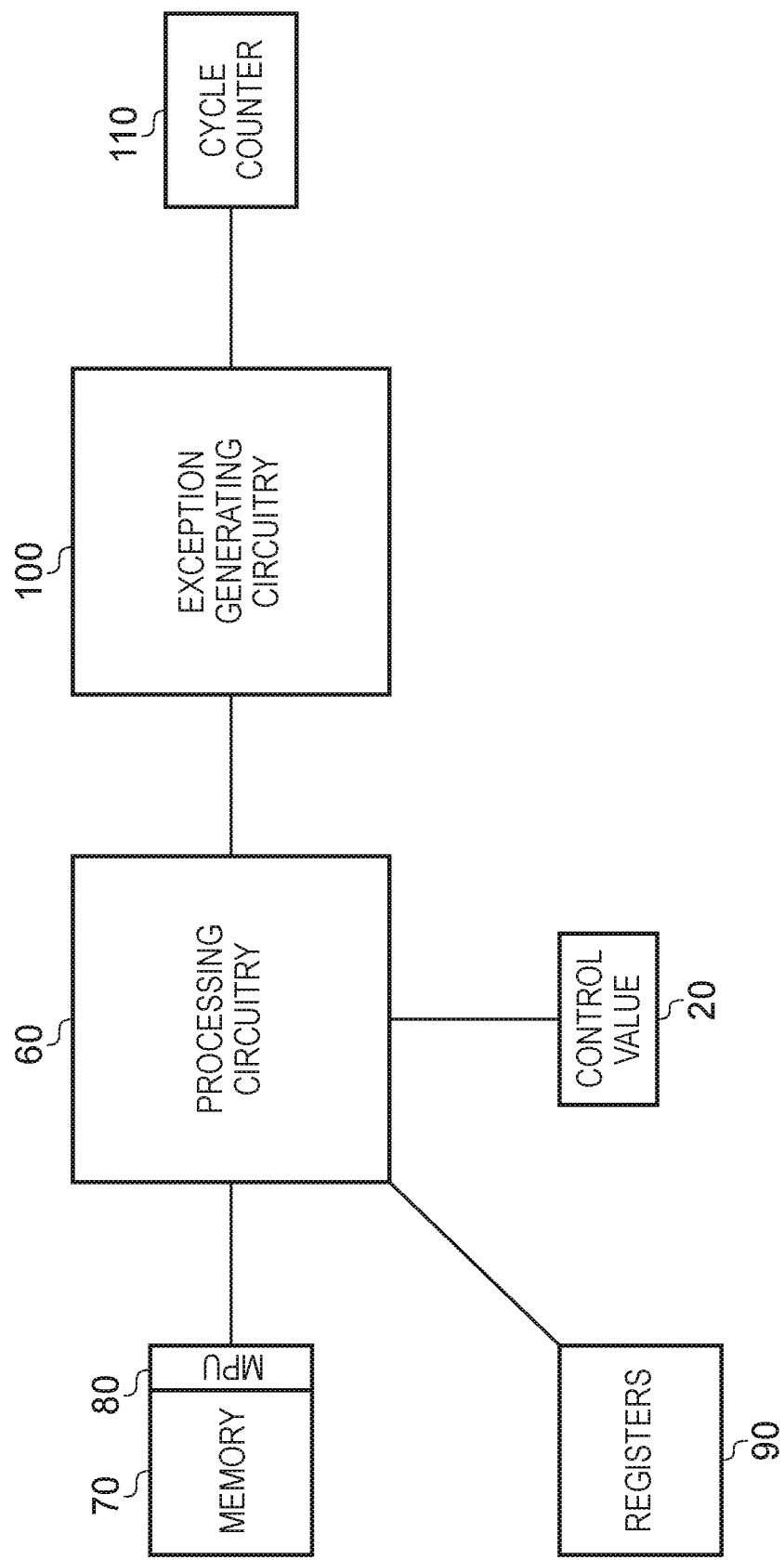
FIG. 2 schematically shows an information processing apparatus in accordance with one embodiment.

FIG. 2 schematically shows an information processing apparatus for implementing the present techniques. In this embodiment, processing circuitry 60 is provided for executing one or more instructions. The one or more instructions may include instructions that are time intensive. In this context, a time intensive instruction may be an instruction that requires a plurality of clock cycles of the processing circuitry 60 for its execution. One or more distinct types of instructions may be predetermined to be time consuming instructions.

The response of the processing circuitry 60 to the attempted execution of a time intensive instruction is dependent on a state of the control value 20. For example, if the control value 20 is set to the value 0 or false, this indicates that time intensive instructions are allowed. Conversely, if the control value is set to the value 1 or true, then this indicates that time intensive instructions are not allowed. It will be appreciated by the skilled person that these values could, of course, be inverted or that other representations may be possible. For example, the control value may represent a set of conditions in which time intensive instructions are allowed to be executed.

In response to a time intensive instruction being encountered by the processing circuitry 60 (e.g. at an issue state or an execution stage) when the control value 20 indicates that time intensive instructions are allowed, the processing circuitry 60 will execute that time intensive instruction. Alternatively, in response to a time intensive instruction being encountered when the control value 20 indicates that time intensive instructions are not allowed, exception generating circuitry 100 will generate a first exception (or interrupt).

The first exception causes the processing circuitry 60 to switch out an active operating system and instead execute the hypervisor 10. The hypervisor 10 responds by suppressing the time intensive instruction so that it is not executed. The hypervisor may then take further action to allow forward progress without executing the time intensive instruction.

The exception generating circuitry 100 may generate other exceptions in addition to the first exception. One example of another exception that might be issued is a context switch exception, which causes the processing circuitry to switch between execution of the different operating systems. Such an exception may be generated periodically based on the value of a cycle counter 110.

In the embodiment shown in FIG. 2, the exception generating circuitry 100 generates a second exception to control the processing circuitry 60 to flip the control value 20. Consequently, the execution of time intensive instructions can be changed. Cycle counter 110 is used to periodically issue this second exception. Consequently, the processing circuitry 60 can be made to periodically allow or disallow time intensive instructions to be issued, or can be made to alternate between the two states at a given period.

The information processing apparatus further includes a memory 70 accessed via a memory protection unit (MPU) 80, which restricts access to the memory 70. The information processing apparatus also comprises a set of registers 90. In other embodiments, there may be provided a memory management unit (MMU) in place or in addition to the MPU.

Time intensive instructions may require a plurality of processing cycles of the processing circuitry 60 in order to execute. However, in some embodiments the time intensive instructions are a predefined set. For example, the predefined set may include a floating point square root instruction, and a divide instruction. The predefined set may also include non-interruptible load multiple instructions in which a plurality of data values stored in memory 70 are transferred to the registers 90. Similarly, the predefined list may include non-interruptible store multiple instructions, in which a plurality of data values stored in the registers 90 are transferred to memory 70. The MPU 80 may indicate that a particular load multiple or store multiple instruction is non-interruptible. This may occur for example by setting a particular bit in the MPU 80 in relation to a particular range of memory addresses of the memory 70. This may be carried out when dealing with device type memory, whereby reading and writing to parts of the memory that are directly mapped to a hardware device controls that hardware device. Such instructions must be non-interruptible in order to ensure that a situation does not arise in which only a subset of data values are stored to or read from a memory, which could result in the hardware device acting in an incorrect or non-deterministic manner.

The predetermined list of instructions may also include at least one predetermined single instruction multiple data (SIMD), such instructions can be used in order to perform a large number of operations in parallel on multiple pieces of data by issuing only a single instruction. For example, a single (SIMD) instruction could be used to perform a matrix multiplication.

Figure 3:
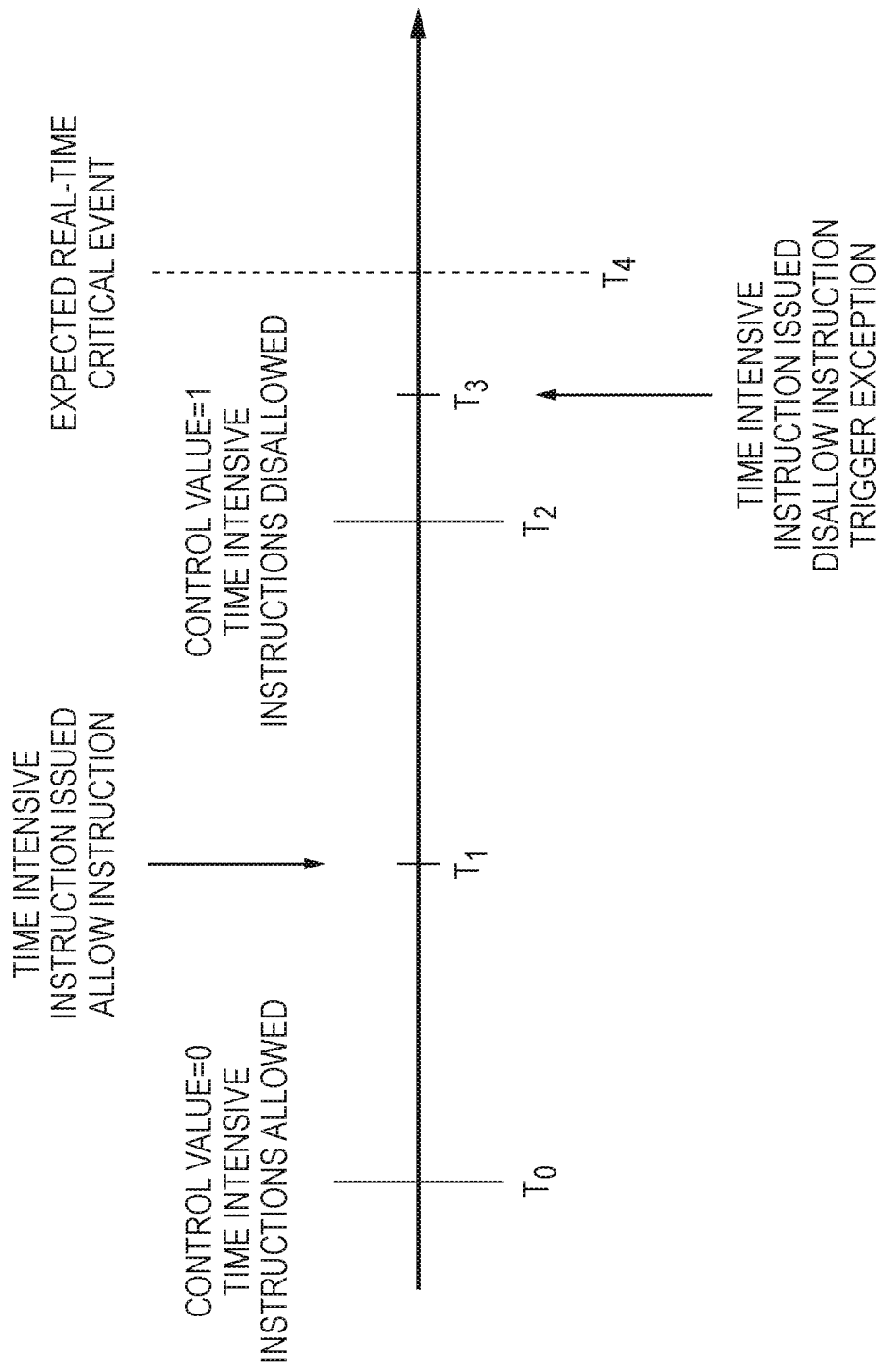
FIG. 3 shows an example of allowing/disabling execution of time intensive instructions based on the status of a control value.

FIG. 3 schematically shows using the control value to control whether time intensive instructions can be executed.

At time $t_0$, the control value is set to 0 indicating that time intensive instructions are allowed.

At time $t_1$, a time intensive instruction is issued. Since, at time $t_1$, the control value is set to 0, indicating that a time intensive instructions are allowed, the instruction is permitted to proceed and the instruction is therefore executed by the processing circuitry 60.

At time $t_2$, the control value is set to 1, indicating that a time intensive instructions are not allowed. Time intensive instructions may be disallowed at time $t_2$ due to the proximity of an expected real-time critical event at time $t_4$. By disallowing time intensive instructions in close proximity to the expected real-time critical event, the situation can be prevented in which a response to the real-time critical event is delayed as a consequence of handling a time intensive instruction.

At time $t_3$, a further time intensive instruction is issued. Since, at time $t_3$, the control value is 1 indicating that time intensive instructions are not allowed, the time intensive instruction will not be permitted to be executed and instead a first exception will be generated by exception generating circuitry 100 to cause the processing circuitry 60 to suppress the time intensive instruction.

Finally, at time $t_4$, the expected real-time critical event occurs. Since time intensive instructions have been disallowed prior to the occurrence of the real-time critical event, it is unlikely that any time intensive instructions will be being processed at time $t_4$. Accordingly, it is possible for the real-time critical event to be responded to almost immediately, with little delay.

FIG. 4A shows a first example in which a processing circuitry 60 responds to the first exception generated by the exception generating circuitry 100 in response to a time intensive instruction being issued when the control value 20 indicates that such instructions are not permitted. As shown in FIG. 4A the processing circuitry 60 is configured to cycle between execution of three different operating systems OS1, OS2 and OS3. Execution occurs in distinct time slices 130, with each time slice being dedicated to a particular guest operating system. The switch from one operating system to another (i.e. from one time slice to another) is referred to as a context switch. Prior to the occurrence of each context switch, a second exception is generated (indicated by the dotted lines in FIG. 4A). The second exception causes the processing circuitry 60 to change the value stored in the control value 20 such that time intensive instructions are not permitted. After the context switch has occurred, the control value 20 is set to allow time intensive instructions once more. Accordingly, as can be seen from FIG. 4A, each time slice 130 can be thought of as a first period of time 140 in which time intensive instructions are permitted, and a second period of time 120 in which time intensive instructions are not permitted. FIG. 4A shows that the second period of time 120 is significantly shorter than the first period of time 140. For example, the ratio of the first period of time 140 to the second period of time 120 may be 9:1. Consequently, time intensive instructions are generally permitted, except that they are not permitted immediately prior to a context switch occurring. Accordingly, there is very little delay in handling each context switch, since it is unlikely that any time intensive instructions will need to complete before the context switch can occur. Therefore, the three operating systems OS1, OS2, and OS3 run at regular schedules and are permitted to execute at deterministic times, with very little various due to context switches being delayed. When an attempt is made to execute a time intensive instruction, when the control value 20 indicates that such instructions are not permitted, the exception generating circuitry 100 will generate a first exception, causing the hypervisor to be executed by the processor 60. The hypervisor may then respond in one of several ways, as illustrated by FIGS. 4A, 4B, and 4C.

In FIG. 4A, the processing circuitry 60 responds to the first exception by suppressing execution of the time intensive instruction and executing none of operating systems OS1, OS2 or OS3. Accordingly, for a period 150 between encountering the time intensive instruction and the next context switch, software that forms part of the hypervisor may be executed, but the guest operating systems cannot.

FIG. 4B is similar to FIG. 4A but shows a different response to the occurrence of a first exception at time $t_3$. In this example, the time intensive instruction is still suppressed but rather than not executing any of the operating systems OS1, OS2, and OS3, the anticipated context switch operation that would shortly occur is brought forward. Accordingly, operating system OS1 is permitted to execute early. In this embodiment, the processing resources are not wasted. However, the deterministic nature of the system changes, since the next operating system is made to execute earlier than would ordinarily be anticipated. It may therefore be simpler to wait for the next context switch as shown in FIG. 4A rather than changing the context switch timings.

FIG. 4C is similar to FIGS. 4A and 4B. The time intensive instruction is still suppressed. However, in response to the first exception occurring at time $t_3$, execution of operation system OS3 continues. For example, if the time intensive instruction occurred as part of a first task under OS3, OS3 may be able to continue executing a different second task rather than the first task. The hypervisor then carries out some action in order to prevent execution of the time intensive instruction. For example, the hypervisor may cause the guest operating system to issue its own context switch in order to switch out a task that caused the time intensive instruction to be executed and instead execute a different task. Alternatively, the hypervisor may respond to the time intensive instruction by issuing an error or exception to indicate that the requested operation cannot currently be performed.

Figure 5:
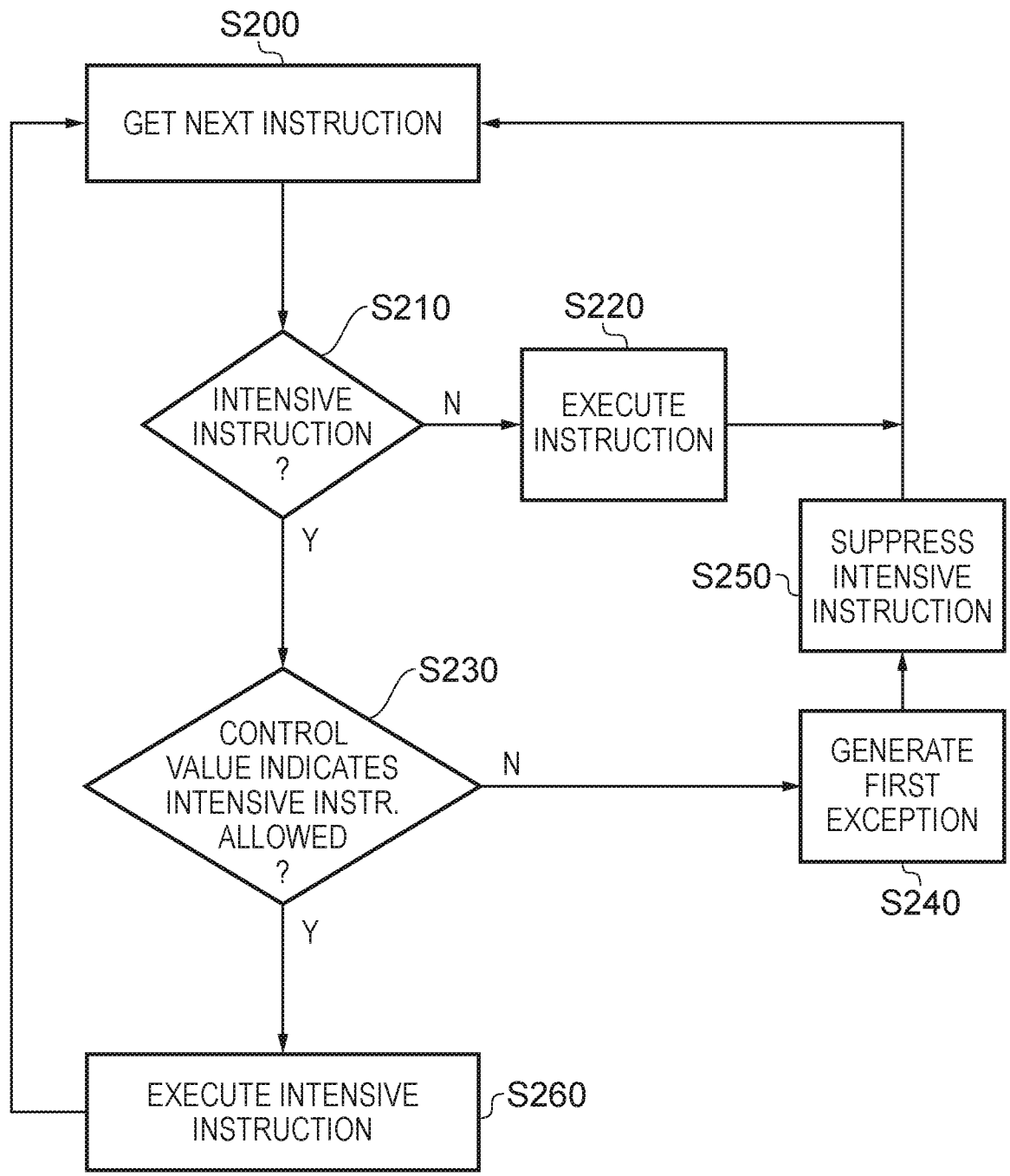
FIG. 5 schematically shows a method of responding to time intensive instructions in accordance with one embodiment.

FIG. 5 schematically shows a method of responding to a time intensive instruction in accordance with one embodiment.

At step S200, the next instruction is fetched. At step S210, the processing circuitry 60 determines whether the fetched instruction is a time intensive instruction or not. If the instruction is not a time intensive instruction, then at step S220, the instruction is executed and the method returns to step S200. However, if at step S210 it is determined that the instruction is a time intensive instruction, then at step S230 it is checked whether the control value indicates that time intensive instructions are allowed. If it is determined that the control value indicates that time intensive instructions are not allowed then at step S240 a first exception is generated and at step S250 the time intensive instruction is suppressed. The method then returns to step S200. However, if at step S230 it is determined that time intensive instructions are permitted, then at step S260 the time intensive instruction is executed and the method returns to step S200.

Although particular embodiments have been described herein, it will be appreciated that the technique is not limited thereto and that many modifications and additions thereto may be made within the scope of the invention. For example, various combinations of the features of the following dependent claims could be made with the features of the independent claims without departing from the scope of the present invention.

The invention claimed is:

1. An information processing apparatus comprising:
processing circuitry configured to execute instructions comprising one or more time intensive instructions and one or more other instructions that is not a time intensive instruction; and
exception generating circuitry configured to generate at least one exception for said processing circuitry,
wherein said processing circuitry is configured to maintain a control value for indicating whether said time intensive instructions can be executed;
wherein said exception generating circuitry is configured, in response to one of said time intensive instructions when said control value is a first value indicating that said time intensive instructions cannot be executed, to generate a first exception to trigger the processing circuitry to suppress execution of said one of said time intensive instructions;
wherein in response to one of said time intensive instructions, said one of said time intensive instructions is permitted to be executed when said control value is a second value indicating that said time intensive instructions can be executed; and
wherein in response to one of said other instructions, said one of said other instructions is permitted to be executed when said control value is the first value and when said control value is the second value.

2. An information processing apparatus according to claim 1,
wherein said time intensive instructions comprise instructions that require multiple processing cycles of said processing circuitry to execute.

3. An information processing apparatus according to claim 1,
wherein said time intensive instructions comprise instructions which cannot be interrupted.

4. An information processing apparatus according to claim 1,
wherein said time intensive instructions comprise at least one of: a floating point square root instruction, a divide instruction, a non-interruptible load multiple instruction, a non-interruptible store multiple instruction, and at least one predetermined single-instruction-multiple-data (SIMD) instruction.

5. An information processing apparatus according to claim 1,
wherein said processing circuitry is configured to execute first software at a first privilege level and to execute second software at a second privilege level higher than the first privilege level.

6. An information processing apparatus according to claim 5,
wherein said second software is configured to control said processing circuitry to change said control value.

7. An information processing apparatus according to claim 5,
said exception generating circuitry is configured to generate said first exception in response to one of said time intensive instructions of said first software.

8. An information processing apparatus according to claim 5, wherein said exception generating circuitry is configured to only generate said first exception in response to one of said time intensive instructions of software executing at a lower privilege level than said second privilege level.

9. An information processing apparatus according to claim 5,
wherein said first software comprises one or more guest operating systems; and
wherein said second software comprises a hypervisor.

10. An information processing apparatus according to claim 1,
wherein said processing circuitry is configured to change said control value in response to one or more predetermined events.

11. An information processing apparatus according to claim 10,
wherein said one or more predetermined events includes a context switch.

12. An information processing apparatus according to claim 11,
wherein in response to said context switch, said processing circuitry is configured to change said control value to said second value.

13. An information processing apparatus according to claim 10,
wherein said one or more predetermined events includes a second exception; and
wherein said exception generating circuitry is configured to generate said second exception a first predetermined period of time before an expected event.

14. An information processing apparatus according to claim 13,
wherein said expected event is a context switch and the second exception occurs a second predetermined period of time after a previous context switch.

15. An information processing apparatus according to claim 14,
wherein said first predetermined period of time is less than said second predetermined period of time.

16. An information processing apparatus according to claim 15,
wherein a ratio of said first predetermined period of time to said second predetermined period of time is 1:9.

17. An information processing apparatus according to claim 13,
wherein, in response to said second exception, said processing circuitry is configured to change said control value to said first value.

18. An information processing apparatus according to claim 5, wherein said processing circuitry is configured to switch to executing said second software in response to said first exception.

19. An information processing apparatus according to claim 18, wherein said processing circuitry is configured to execute one of a plurality of first software at said first privilege level.

20. An information processing apparatus according to claim 19,
wherein, in response to said first exception, said second software is configured to control said processing circuitry to change an active one of said plurality of first software.

21. An information processing apparatus according to claim 19,
wherein, in response to said first exception, said processing circuitry is configured to not execute said plurality of first software until a subsequent context switch.

22. An information processing apparatus according to claim 19,
wherein, in response to said first exception, said processing circuitry is configured to continue execution of an active one of said plurality of first software without executing said one of said time intensive instructions.

23. A machine-implemented method for an information processing apparatus, said method comprising the steps:

executing one or more instructions comprising one or more time intensive instructions and one or more other instructions that is not a time intensive instruction;

maintaining a control value for indicating whether said time intensive instructions can be executed;

in response to one of said time intensive instructions when said control value indicates that said time intensive instructions cannot be executed, generating a first exception to suppress execution of said one of said time intensive instructions; and in response to one of said time intensive instructions when said control value indicates that said time intensive instructions can be executed, permitting execution of said one of said time intensive instructions; and in response to one of said other instructions, permitting execution of said one of said other instructions when said control value is the first value and when said control value is the second value.

24. An information processing apparatus comprising:

means for executing instructions comprising one or more time intensive instructions and one or more other instructions that is not a time intensive instruction; and means for generating at least one exception for said processing circuitry, wherein said means for executing is configured to maintain a control value for indicating whether said time intensive instructions can be executed;

wherein said means for generating is configured, in response to one of said time intensive instructions when said control value is a first value indicating that said time intensive instructions cannot be executed, to generate a first exception to trigger the means for executing to suppress execution of said one of said time intensive instructions;

wherein in response to one of said time intensive instructions, said one of said time intensive instructions is permitted to be executed when said control value is a second value indicating that said time intensive instructions can be executed; and wherein in response to one of said other instructions, said one of said other instructions is permitted to be executed when said control value is the first value and when said control value is the second value.

\* \* \* \* \*